G. G. WOLFE.

Reservoir Cooking-Stoves.

No. 6,217. Reissued Jan. 12, 1875.

WITNESSES:

Jas. E. Hutchinson

John R. Young

INVENTOR.

Gordon G. Wolfe, by

Prindle and Beane, his Attys

THE GRAPHIC CO. PHOTO-LITH. 39 & 41 PARK PLACE, N.Y.

UNITED STATES PATENT OFFICE.

GURDON G. WOLFE, OF TROY, NEW YORK.

IMPROVEMENT IN RESERVOIR COOKING-STOVES.

Specification forming part of Letters Patent No. 76,292, dated March 31, 1868; reissue No. 5,442, dated June 10, 1873; reissue No. 6,217, dated January 12, 1875; application filed January 28, 1874.

DIVISION A.

*To all whom it may concern:*

Be it known that I, GURDON G. WOLFE, of the city of Troy, in the county of Rensselaer and State of New York, did invent certain new and useful Improvements in Cooking-Stoves, for which Letters Patent No. 76,292 were issued to me upon the 31st day of March, 1868, and thereafter duly surrendered and reissued, bearing date of June 10, 1873, and numbered 5,442, which reissued Letters Patent have been found defective, in that the specification and claims do not cover and embrace all of the original invention, as shown in the model and drawings, filed in the Patent Office upon the 14th day of February, 1868.

Now, therefore, being desirous of reissuing said reissued Letters Patent, herewith surrendered, I have prepared and do hereby declare that the following is a full, clear, and exact description of the said invention, reference being had to the accompanying drawing making a part of this specification, in which—

Figure 1:
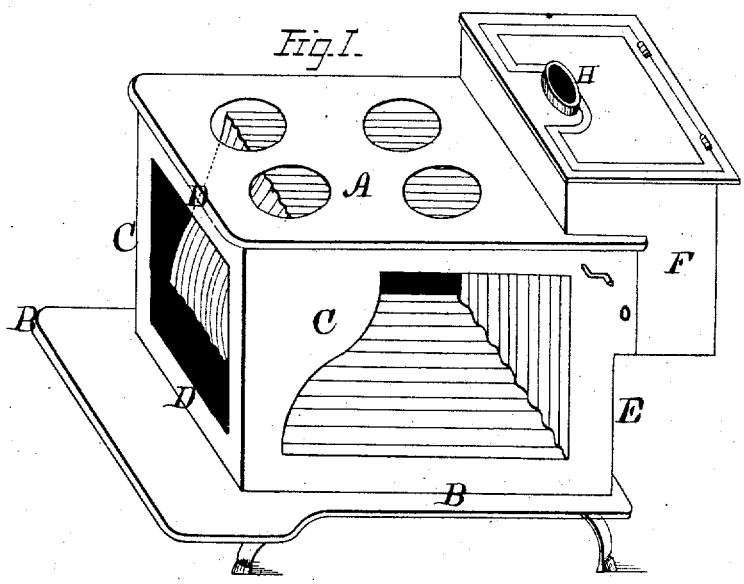
Figure 2:
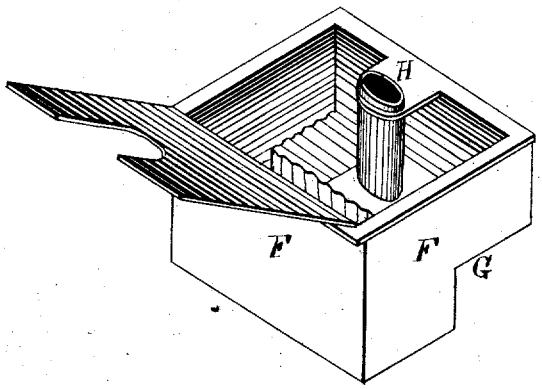

Figure 1 is a perspective view of a stove having attached to its rear end my improved reservoir; and Fig. 2 is a like view of said reservoir detached from said stove, and having its hinged cover opened, so as to afford a view of its interior.

Letters of like name and kind refer to like parts in each of the figures.

The design of my invention is to so construct a water-reservoir for use upon or in connection with a cooking-stove as to enable a large proportion of the surplus heat to be economized by being imparted to the contents of said reservoir; and it consists, principally, in a water-reservoir constructed so as to embrace the rear end and upper side of a cooking-stove, substantially as and for the purpose hereinafter specified.

It consists, farther, in a water-reservoir, embracing the rear end and upper side of a cooking-stove, and provided with a pipe or flue which incloses the upper end, and forms a continuation of the exit-flue, substantially as and for the purpose hereinafter shown.

It consists, finally, in a water-reservoir, embracing the rear end and upper side of a cooking-stove, and forming a covering for the upper ends of the vertical flues, from which the top plate has been removed, substantially as and for the purpose hereinafter set forth.

In the annexed drawing, A represents the top plate, B the bottom plate, C and C the side plates, D the front plate, and E the rear end plate, of a cooking-stove, containing a fire-box, oven, and the usual system of flues. At the rear end of the stove is placed a water-reservoir, F, which, as shown, is provided, within its front and lower sides, with a recess or rabbet, G, which corresponds to the shape of the rear upper corner of said stove, so as to cause said reservoir, when placed upon the latter to embrace the upper side and rear end of the same. At a suitable point within the front portion of the reservoir F is provided a pipe or flue, H, which, at its lower end, incloses the upper end of the usual exit-flue of the stove, and forms a continuation of the same, the usual sheet-metal pipe being placed upon the upper end of said flue H, and extended from thence to the chimney.

As thus constructed and combined with the stove, it will be seen that the reservoir is in contact with the upper ends and rear sides of each of the vertical flues, and that thereby its heating capacity is materially greater than it would be practicable to obtain in a reservoir having equal capacity, and applied wholly to the upper or rear sides of a stove.

The advantages obtained by this construction are, first, it enables a large percentage of the surplus heat of the stove to be utilized for the purpose of heating water without encroachment upon the space required for a warming-closet or material interference with the capacity of the upper side of said stove; second, it permits of the employment of a reservoir having a much larger capacity for a given depth than would be practicable if it were placed wholly above or in rear of the stove.

Having thus fully set forth the nature and merits of my invention, what I claim as new is—

1. A water-reservoir, constructed to embrace the rear end and upper side of a cooking-stove, substantially as and for the purpose specified.

2. In combination with the rear end and upper side of a cooking-stove, a water-reservoir, constructed to embrace the same, and provided with a pipe or flue, which incloses the upper end, and forms a continuation of the exit-flue, substantially as and for the purpose shown.

3. In combination with the rear end and upper side of a cooking-stove, a water-reservoir, which embraces the same, and forms a covering for the upper ends of the vertical flues, substantially as and for the purpose set forth.

In testimony whereof I have hereunto set my hand this 24th day of January, 1874.

GURDON G. WOLFE.

Witnesses:

WILLIAM TOUGH,
NELSON PRAMER.